US012656958B2

(12) United States Patent
Kim et al.

(10) Patent No.: US 12,656,958 B2
(45) Date of Patent: Jun. 16, 2026

(54) CONFLICT AVOIDANCE FOR BANK-SHARED CIRCUITRY THAT SUPPORTS USAGE-BASED DISTURBANCE MITIGATION

(71) Applicant: Micron Technology, Inc., Boise, ID (US)

(72) Inventors: Kang-Yong Kim, Boise, ID (US); Yang Lu, Boise, ID (US); Wonjun Choi, Boise, ID (US); Mark Kalei Hadrick, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 7 days.

(21) Appl. No.: 18/627,859

(22) Filed: Apr. 5, 2024

(65) Prior Publication Data

US 2024/0338126 A1 Oct. 10, 2024

Related U.S. Application Data

(60) Provisional application No. 63/494,688, filed on Apr. 6, 2023.

(51) Int. Cl.
G06F 3/06 (2006.01)

(52) U.S. Cl.
CPC .......... G06F 3/0619 (2013.01); G06F 3/0653 (2013.01); G06F 3/0673 (2013.01)

(58) Field of Classification Search
CPC ..... G06F 3/0619; G06F 3/0653; G06F 3/0673
See application file for complete search history.

(56) References Cited

U.S. PATENT DOCUMENTS

| | | | | |
|---|---|---|---|---|
| 2011/0122687 A1* | 5/2011 | Kwon | ................ | G11C 16/3418 |
| | | | | 365/185.02 |
| 2014/0003124 A1* | 1/2014 | Youn | .................. | G11C 13/0002 |
| | | | | 365/148 |
| 2021/0011645 A1* | 1/2021 | Martinelli | ........... | G06F 11/1068 |
| 2021/0012817 A1* | 1/2021 | Laurent | .................... | G11C 7/12 |
| 2023/0185460 A1* | 6/2023 | Kim | .................. | G11C 11/40622 |
| | | | | 711/105 |
| 2024/0028221 A1* | 1/2024 | Lee | ........................ | G06F 3/0623 |

* cited by examiner

*Primary Examiner* — Jason W Blust
(74) *Attorney, Agent, or Firm* — Colby Nipper PLLC

(57) ABSTRACT

Apparatuses and techniques for implementing collision avoidance for bank-shared circuitry that supports usage-based disturbance mitigation are described. A memory device includes bank-shared circuitry coupled to multiple banks. The bank-shared circuitry can support usage-based disturbance mitigation. By using the bank-shared circuitry to service multiple banks, the memory device can have a smaller footprint and can be cheaper to manufacture compared to other memory devices with circuitry dedicated for each bank. To avoid conflicts associated with some sequences of commands that may relate to a same bank or different banks and utilize the bank-shared circuitry, the memory controller applies an appropriate timing offset (or delay) between commands. The timing offset allows the memory device time to finish utilizing the bank-shared circuitry for usage-based disturbance mitigation prior to utilizing the bank-shared circuitry in accordance with a subsequent command.

20 Claims, 9 Drawing Sheets

800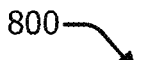

Transmit, to a memory device, a first command
that causes the memory device utilizing a subset
of sense amplifiers of a data sense amplifier circuit
of the memory device, the subset of sense amplifiers
coupled to at least two banks of the memory device
and circuitry of the memory device that mitigates
usage-based disturbance within the at least two banks
802

Transmit, to the memory device, a second command
associated with the memory device utilizing the subset
of sense amplifiers, the transmission of the second command
having a timing offset relative to the first command such
that the memory device finishes utilizing the subset of sense
amplifiers based on the first command prior to utilizing the
subset of sense amplifiers based on the second command
804

FIG. 8

900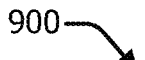

Receive, from a memory controller, two
sequential commands that are separated in time
by at least a timing offset, the timing offset enabling
a memory device to finish utilizing a subset of sense
amplifiers for usage-based disturbance mitigation based
on a first command of the two sequential commands
prior to utilizing the subset of sense amplifiers based
on a second command of the two sequential commands
902

*FIG. 9*

CONFLICT AVOIDANCE FOR BANK-SHARED CIRCUITRY THAT SUPPORTS USAGE-BASED DISTURBANCE MITIGATION

CROSS-REFERENCE TO RELATED APPLICATION(S)

This application claims the benefit of U.S. Provisional Patent Application Ser. No. 63/494,688 filed on Apr. 6, 2023, the disclosure of which is incorporated by reference herein in its entirety.

BACKGROUND

Computers, smartphones, and other electronic devices rely on processors and memories. A processor executes code based on data to run applications and provide features to a user. The processor obtains the code and the data from a memory. The memory in an electronic device can include volatile memory (e.g., random-access memory (RAM)) and non-volatile memory (e.g., flash memory). Like the capabilities of a processor, the capabilities of a memory can impact the performance of an electronic device. This performance impact can increase as processors are developed that execute code faster and as applications operate on increasingly larger data sets that require ever-larger memories.

BRIEF DESCRIPTION OF THE DRAWINGS

Apparatuses of and techniques for implementing aspects of conflict avoidance for bank-shared circuitry that supports usage-based disturbance mitigation are described with reference to the following drawings. The same numbers are used throughout the drawings to reference like features and components:

FIG. 8 illustrates an example method performed by a memory controller for implementing aspects of conflict avoidance for bank-shared circuitry that supports usage-based disturbance mitigation; and FIG. 9 illustrates an example method performed by a memory device for implementing aspects of conflict avoidance for bank-shared circuitry that supports usage-based disturbance mitigation.

DETAILED DESCRIPTION

Overview

Figure 1:
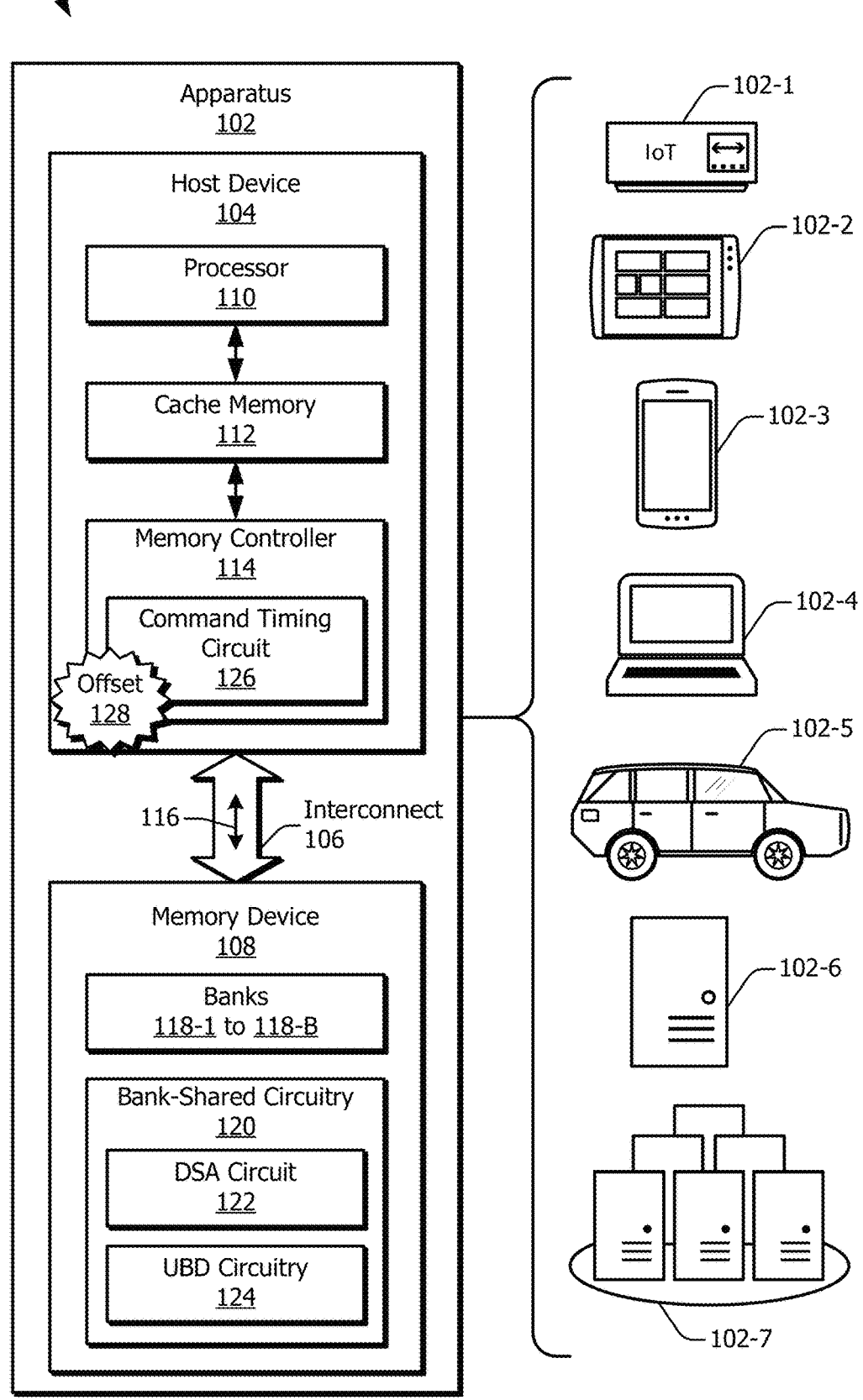
FIG. 1 illustrates example apparatuses that can implement aspects of conflict avoidance for bank-shared circuitry that supports usage-based disturbance mitigation.

Processors and memory work in tandem to provide features to users of computers and other electronic devices. As processors and memory operate more quickly together in a complementary manner, an electronic device can provide enhanced features, such as high-resolution graphics and artificial intelligence (AI) analysis. Some applications, such as those for financial services, medical devices, and advanced driver assistance systems (ADAS), can also demand more-reliable memories. These applications use increasingly reliable memories to limit errors in financial transactions, medical decisions, and object identification. However, in some implementations, more-reliable memories can sacrifice bit densities, power efficiency, and simplicity.

To meet the demands for physically smaller memories, memory devices can be designed with higher chip densities. Increasing chip density, however, can increase the electromagnetic coupling (e.g., capacitive coupling) between adjacent or proximate rows of memory cells due, at least in part, to a shrinking distance between these rows. With this undesired coupling, activation (or charging) of a first row of memory cells can sometimes negatively impact a second nearby row of memory cells. In particular, activation of the first row can generate interference, or crosstalk, that causes the second row to experience a voltage fluctuation. In some instances, this voltage fluctuation can cause a state (or value) of a memory cell in the second row to be incorrectly determined by a sense amplifier. Consider an example in which a state of a memory cell in the second row is a "1". In this example, the voltage fluctuation can cause a sense amplifier to incorrectly determine the state of the memory cell to be a "0" instead of a "1". Left unchecked, this interference can lead to memory errors or data loss within the memory device.

In some circumstances, a particular row of memory cells is activated repeatedly in an unintentional or intentional (sometimes malicious) manner. Consider, for instance, that memory cells in an $R^{th}$ row are subjected to repeated activation, which causes one or more memory cells in an adjacent row (e.g., within an R+1 row, an R+2 row, an R−1 row, and/or an R−2 row) to change states. This effect is referred to as usage-based disturbance. The occurrence of usage-based disturbance can lead to the corruption or changing of contents within the affected row of memory.

Some memory devices utilize circuits that can detect usage-based disturbance and mitigate its effects. These circuits, however, can add complexity and cost to a memory device. Additionally, these circuits can increase an overall footprint and power consumption of the memory device, which can make it challenging to integrate within space-constrained devices, including portable devices.

To address this and other issues regarding usage-based disturbance, this document describes bank-shared circuitry, which includes a data sense amplifier circuit and usage-based disturbance circuitry coupled to the data sense amplifier circuit. The bank-shared circuitry is coupled to at least two banks within a memory device. With the data sense amplifier circuit, the bank-shared circuitry provides signal amplification across input/output lines associated with multiple banks. The bank-shared circuitry also manages usage-based disturbance across multiple banks using the usage-based disturbance circuitry. By using the same circuitry to service multiple banks, the memory device can have a smaller footprint and can be cheaper to manufacture compared to other memory devices with circuitry dedicated for each bank.

When a row in a bank is activated, the bank-shared circuit reads data from the row to monitor for a condition associated with usage-based disturbance. This data passes through the data sense amplifier circuit to the usage-based disturbance circuitry. In some implementations, this usage-based disturbance monitoring occurs in response to a read or write command that is received from a memory controller. With the data sense amplification circuit being used to support usage-based disturbance monitoring, there is a potential for conflict as the memory die can receive another command from the memory controller that also utilizes the data sense amplification circuit. To avoid conflicts associated with some sequences of commands that may relate to a same bank or different banks, the memory controller applies an appropriate timing offset (or delay) between commands. The timing offset allows the memory device time to finish utilizing the data sense amplifier circuit for usage-based disturbance mitigation prior to utilizing the bank-shared circuitry in accordance with a subsequent command.

Example Operating Environments

FIG. 1 illustrates, at 100 generally, an example operating environment including an apparatus 102 that can implement conflict avoidance for bank-shared circuitry that supports usage-based disturbance mitigation. The apparatus 102 can include various types of electronic devices, including an internet-of-things (IoT) device 102-1, tablet device 102-2, smartphone 102-3, notebook computer 102-4, passenger vehicle 102-5, server computer 102-6, and server cluster 102-7 that may be part of cloud computing infrastructure, a data center, or a portion thereof (e.g., a printed circuit board (PCB)). Other examples of the apparatus 102 include a wearable device (e.g., a smartwatch or intelligent glasses), entertainment device (e.g., a set-top box, video dongle, smart television, a gaming device), desktop computer, motherboard, server blade, consumer appliance, vehicle, drone, industrial equipment, security device, sensor, or the electronic components thereof. Each type of apparatus can include one or more components to provide computing functionalities or features.

In example implementations, the apparatus 102 can include at least one host device 104, at least one interconnect 106, and at least one memory device 108. The host device 104 can include at least one processor 110, at least one cache memory 112, and a memory controller 114. The memory device 108, which can also be realized with a memory module, can include, for example, a dynamic random-access memory (DRAM) die or module (e.g., Low-Power Double Data Rate synchronous DRAM (LPDDR SDRAM)). The DRAM die or module can include a three-dimensional (3D) stacked DRAM device, which may be a high-bandwidth memory (HBM) device or a hybrid memory cube (HMC) device. The memory device 108 can operate as a main memory for the apparatus 102. Although not illustrated, the apparatus 102 can also include storage memory. The storage memory can include, for example, a storage-class memory device (e.g., a flash memory, hard disk drive, solid-state drive, phase-change memory (PCM), or memory employing 3D XPoint™).

The processor 110 is operatively coupled to the cache memory 112, which is operatively coupled to the memory controller 114. The processor 110 is also coupled, directly or indirectly, to the memory controller 114. The host device 104 may include other components to form, for instance, a system-on-a-chip (SoC). The processor 110 may include a general-purpose processor, central processing unit, graphics processing unit (GPU), neural network engine or accelerator, application-specific integrated circuit (ASIC), field-programmable gate array (FPGA) integrated circuit (IC), or communications processor (e.g., a modem or baseband processor).

In operation, the memory controller 114 can provide a high-level or logical interface between the processor 110 and at least one memory (e.g., an external memory). The memory controller 114 may be realized with any of a variety of suitable memory controllers (e.g., a double-data-rate (DDR) memory controller that can process requests for data stored on the memory device 108). Although not shown, the host device 104 may include a physical interface (PHY) that transfers data between the memory controller 114 and the memory device 108 through the interconnect 106. For example, the physical interface may be an interface that is compatible with a DDR PHY Interface (DFI) Group interface protocol. The memory controller 114 can, for example, receive memory requests from the processor 110 and provide the memory requests to external memory with appropriate formatting, timing, and reordering. The memory controller 114 can also forward to the processor 110 responses to the memory requests received from external memory.

The host device 104 is operatively coupled, via the interconnect 106, to the memory device 108. In some examples, the memory device 108 is connected to the host device 104 via the interconnect 106 with an intervening buffer or cache. The memory device 108 may operatively couple to storage memory (not shown). The host device 104 can also be coupled, directly or indirectly via the interconnect 106, to the memory device 108 and the storage memory. The interconnect 106 and other interconnects (not illustrated in FIG. 1) can transfer data between two or more components of the apparatus 102. Examples of the interconnect 106 include a bus (e.g., a unidirectional or bidirectional bus), switching fabric, or one or more wires that carry voltage or current signals. The interconnect 106 can propagate one or more communications 116 between the host device 104 and the memory device 108. For example, the host device 104 may transmit a memory request to the memory device 108 over the interconnect 106. Also, the memory device 108 may transmit a corresponding memory response to the host device 104 over the interconnect 106.

The illustrated components of the apparatus 102 represent an example architecture with a hierarchical memory system. A hierarchical memory system may include memories at different levels, with each level having memory with a different speed or capacity. As illustrated, the cache memory 112 logically couples the processor 110 to the memory device 108. In the illustrated implementation, the cache memory 112 is at a higher level than the memory device 108. A storage memory, in turn, can be at a lower level than the main memory (e.g., the memory device 108). Memory at lower hierarchical levels may have a decreased speed but increased capacity relative to memory at higher hierarchical levels.

The apparatus 102 can be implemented in various manners with more, fewer, or different components. For example, the host device 104 may include multiple cache memories (e.g., including multiple levels of cache memory) or no cache memory. In other implementations, the host device 104 may omit the processor 110 or the memory controller 114. A memory (e.g., the memory device 108) may have an "internal" or "local" cache memory. As another example, the apparatus 102 may include cache memory between the interconnect 106 and the memory device 108.

Computer engineers can also include any of the illustrated components in distributed or shared memory systems.

Computer engineers may implement the host device 104 and the various memories in multiple manners. In some cases, the host device 104 and the memory device 108 can be disposed on, or physically supported by, a printed circuit board (e.g., a rigid or flexible motherboard). The host device 104 and the memory device 108 may additionally be integrated together on an integrated circuit or fabricated on separate integrated circuits and packaged together. The memory device 108 may also be coupled to multiple host devices 104 via one or more interconnects 106 and may respond to memory requests from two or more host devices 104. Each host device 104 may include a respective memory controller 114, or the multiple host devices 104 may share a memory controller 114. This document describes with reference to FIG. 1 an example computing system architecture having at least one host device 104 coupled to a memory device 108.

Two or more memory components (e.g., modules, dies, banks, or bank groups) can share the electrical paths or couplings of the interconnect 106. The interconnect 106 can include at least one command-and-address bus (CA bus) and at least one data bus (DQ bus). The command-and-address bus can transmit addresses and commands from the memory controller 114 of the host device 104 to the memory device 108, which may exclude propagation of data. The data bus can propagate data between the memory controller 114 and the memory device 108. The memory device 108 may also be implemented as any suitable memory including, but not limited to, DRAM, SDRAM, three-dimensional (3D) stacked DRAM, DDR memory, or LPDDR memory (e.g., LPDDR DRAM or LPDDR SDRAM).

The memory device 108 can form at least part of the main memory of the apparatus 102. The memory device 108 may, however, form at least part of a cache memory, a storage memory, or a system-on-chip of the apparatus 102. The memory device 108 includes banks 118-1 to 118-B and bank-shared circuitry 120, which is coupled to the banks 118-1 to 118-B. The variable B represents a positive integer. The bank-shared circuitry 120 supports memory operations that are performed with respect to the banks 118-1 to 118-B.

The bank-shared circuitry 120 includes a data sense amplifier circuit 122 (DSA circuit 122) and usage-based disturbance circuitry 124 (UBD circuitry 124). Data can pass through the data sense amplifier circuit 122 during memory operations that involve one or more of the banks 118-1 to 118-B. The data sense amplifier circuit 122 provides signal amplification across input/output lines associated with the banks 118-1 to 118-B. A subset of sense amplifiers within the data sense amplifier circuit 122 is coupled to the usage-based disturbance circuitry 124.

The usage-based disturbance circuitry 124 monitors and mitigates usage-based disturbance within the banks 118-1 to 118-B. The usage-based disturbance circuitry 124 can be implemented using software, firmware, hardware, fixed logic circuitry, or combinations thereof. In an example implementation, the usage-based disturbance circuitry 124 includes at least one counter circuit for detecting a condition associated with usage-based disturbance, at least one queue for mitigating usage-based disturbance, and at least one error-correction-code (ECC) circuit for detecting and/or correcting bit errors.

To ensure the bank-shared circuitry 120 can be utilized for sequential commands involving the same bank 118 or different banks 118 without conflict, the memory controller 114 includes a command timing circuit 126. The command timing circuit 126 applies an appropriate timing offset 128 (offset 128) (or delay) between two sequential commands. In general, the timing offset 128 provides the memory device 108 sufficient time to finish utilizing the bank-shared circuitry for usage-based disturbance mitigation prior to utilizing the bank-shared circuitry in accordance with a subsequent memory operation. In some cases, the command timing circuit 126 can reference a look-up table (LUT) that includes multiple timing offsets 128 associated with different sets of sequential commands. Example commands are further described with respect to FIG. 6.

In some implementations, the command timing circuit 126 can dynamically select an appropriate table of timing offsets 128 based on whether the memory device 108 performs usage-based disturbance mitigation or not. For example, the command timing circuit 126 can utilize a first table of timing offsets 128 that provides the memory device 108 sufficient time to perform usage-based disturbance mitigation. Alternatively, if the memory device 108 does not perform usage-based disturbance mitigation, the command timing circuit 126 can utilize a second table of timing offsets. In general, the second table includes timing offsets with a shorter duration compared to the timing offsets 128 associated with the first table. The bank-shared circuitry 120 is further described with respect to FIG. 2.

Figure 2:
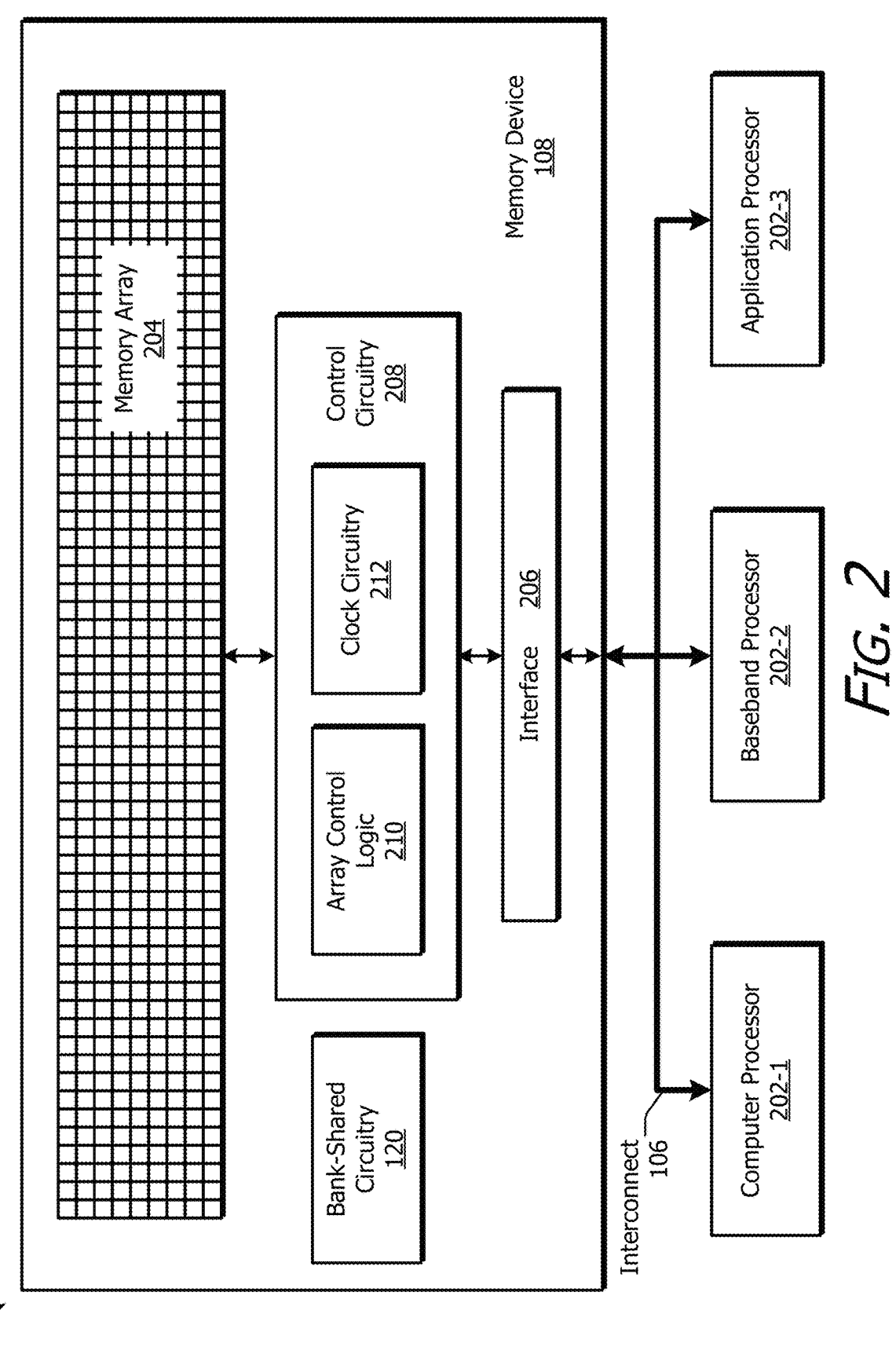
FIG. 2 illustrates an example computing system that can implement aspects of bank-shared circuitry within a memory device.

FIG. 2 illustrates an example computing system 200 that can implement aspects of conflict avoidance for bank-shared circuitry 120 that supports usage-based disturbance mitigation. In some implementations, the computing system 200 includes at least one memory device 108, at least one interconnect 106, and at least one processor 202. The memory device 108 can include, or be associated with, at least one memory array 204, at least one interface 206, and control circuitry 208 (or periphery circuitry) operatively coupled to the memory array 204. The memory array 204 can include an array of memory cells, including but not limited to memory cells of DRAM, SDRAM, three-dimensional (3D) stacked DRAM, DDR memory, LPDDR SDRAM, and so forth. The memory array 204 and the control circuitry 208 may be components on a single semiconductor die or on separate semiconductor dies. The memory array 204 or the control circuitry 208 may also be distributed across multiple dies. This control circuitry 208 may manage traffic on a bus that is separate from the interconnect 106.

The control circuitry 208 can include various components that the memory device 108 can use to perform various operations. These operations can include communicating with other devices, managing memory performance, performing refresh operations (e.g., self-refresh operations or auto-refresh operations), and performing memory read or write operations. For example, the control circuitry 208 can include at least one instance of array control logic 210 and clock circuitry 212. The array control logic 210 can include circuitry that provides command decoding, address decoding, input/output functions, amplification circuitry, power supply management, power control modes, and other functions. The clock circuitry 212 can synchronize various memory components with one or more external clock signals provided over the interconnect 106, including a command-and-address clock or a data clock. The clock circuitry 212 can also use an internal clock signal to synchronize memory components and may provide timer functionality.

The memory device 108 also includes the bank-shared circuitry 120. In some aspects, the bank-shared circuitry 120 can be considered part of the control circuitry 208. For example, the data sense amplifier circuit 122 of the bank-shared circuitry 120 can be part of the array control logic 210. As another example, the usage-based disturbance circuitry 124 can be another circuit of the control circuitry 208.

The interface 206 can couple the control circuitry 208 or the memory array 204 directly or indirectly to the interconnect 106. In some implementations, the bank-shared circuitry 120, the array control logic 210, and the clock circuitry 212 can be part of a single component (e.g., the control circuitry 208). In other implementations, one or more of the bank-shared circuitry 120, the array control logic 210, or the clock circuitry 212 may be implemented as separate components, which can be provided on a single semiconductor die or disposed across multiple semiconductor dies. These components may individually or jointly couple to the interconnect 106 via the interface 206.

The interconnect 106 may use one or more of a variety of interconnects that communicatively couple together various components and enable commands, addresses, or other information and data to be transferred between two or more components (e.g., between the memory device 108 and the processor 202). Although the interconnect 106 is illustrated with a single line in FIG. 2, the interconnect 106 may include at least one bus, at least one switching fabric, one or more wires or traces that carry voltage or current signals, at least one switch, one or more buffers, and so forth. Further, the interconnect 106 may be separated into at least a command-and-address bus and a data bus.

In some aspects, the memory device 108 may be a "separate" component relative to the host device 104 (of FIG. 1) or any of the processors 202. The separate components can include a printed circuit board, memory card, memory stick, and memory module (e.g., a single in-line memory module (SIMM) or dual in-line memory module (DIMM)). Thus, separate physical components may be located together within the same housing of an electronic device or may be distributed over a server rack, a data center, and so forth. Alternatively, the memory device 108 may be integrated with other physical components, including the host device 104 or the processor 202, by being combined on a printed circuit board or in a single package or a system-on-chip.

As shown in FIG. 2, the processors 202 may include a computer processor 202-1, a baseband processor 202-2, and an application processor 202-3, coupled to the memory device 108 through the interconnect 106. The processors 202 may include or form a part of a central processing unit, graphics processing unit, system-on-chip, application-specific integrated circuit, or field-programmable gate array. In some cases, a single processor can comprise multiple processing resources, each dedicated to different functions (e.g., modem management, applications, graphics, central processing). In some implementations, the baseband processor 202-2 may include or be coupled to a modem (not illustrated in FIG. 2) and referred to as a modem processor. The modem or the baseband processor 202-2 may be coupled wirelessly to a network via, for example, cellular, Wi-Fi®, Bluetooth®, near field, or another technology or protocol for wireless communication.

In some implementations, the processors 202 may be connected directly to the memory device 108 (e.g., via the interconnect 106). In other implementations, one or more of the processors 202 may be indirectly connected to the memory device 108 (e.g., over a network connection or through one or more other devices).

Example Techniques and Hardware

Figure 3:
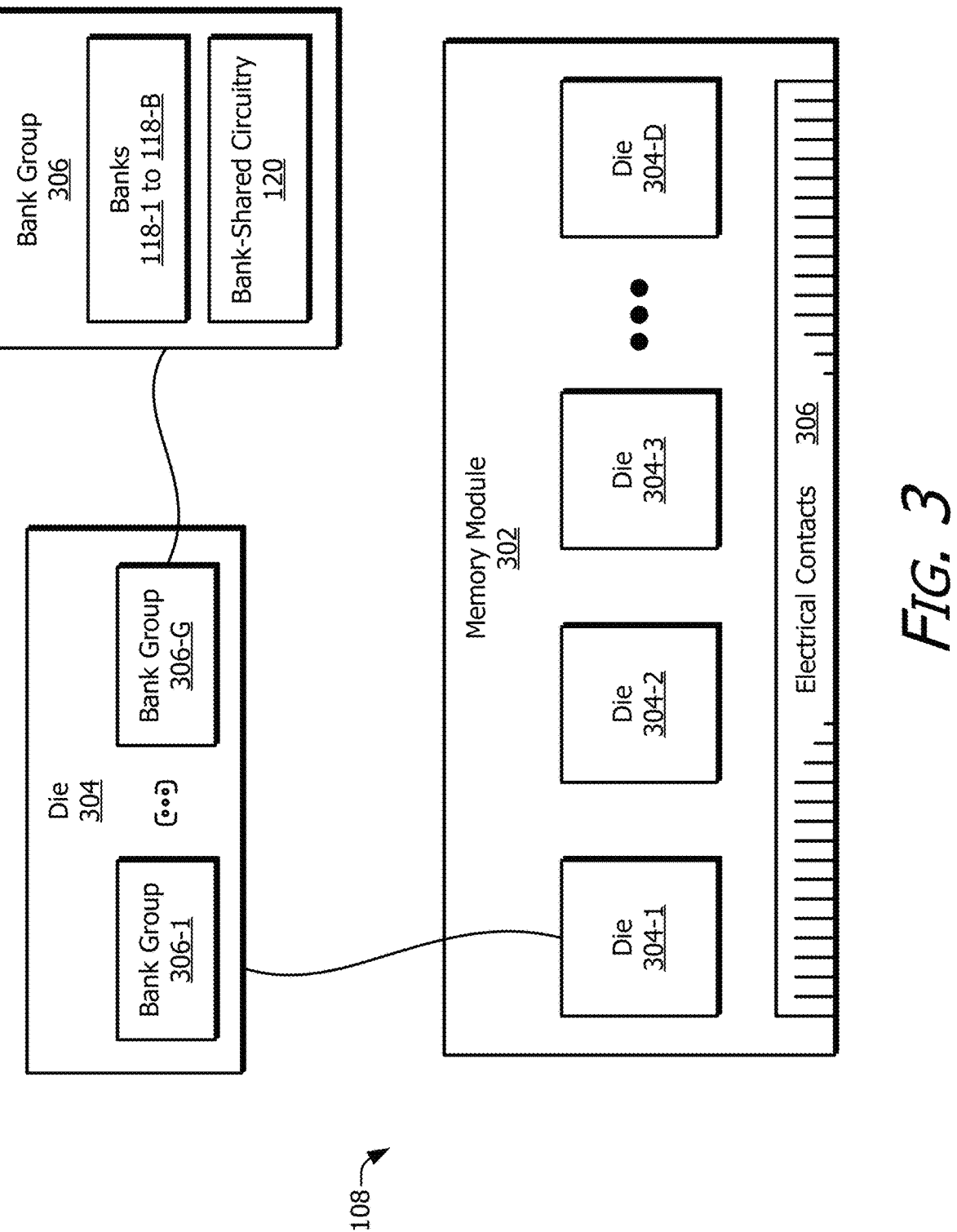
FIG. 3 illustrates an example memory device in which aspects of bank-shared circuitry may be implemented.

FIG. 3 illustrates an example memory device 108 in which aspects of the bank-shared circuitry 120 can be implemented. The memory device 108 includes a memory module 302, which can include multiple dies 304. As illustrated, the memory module 302 includes a first die 304-1, a second die 304-2, a third die 304-3, and a Dth die 304-D, with D representing a positive integer. The memory module 302 can be a SIMM or a DIMM. As another example, the memory module 302 can interface with other components via a bus interconnect (e.g., a Peripheral Component Interconnect Express (PCIe®) bus). The memory device 108 illustrated in FIGS. 1 and 2 can correspond, for example, to multiple dies (or dice) 304-1 through 304-D, or a memory module 302 with two or more dies 304. As shown, the memory module 302 can include one or more electrical contacts 306 (e.g., pins) to interface the memory module 302 to other components.

The memory module 302 can be implemented in various manners. For example, the memory module 302 may include a printed circuit board, and the multiple dies 304-1 through 304-D may be mounted or otherwise attached to the printed circuit board. The dies 304 (e.g., memory dies) may be arranged in a line or along two or more dimensions (e.g., forming a grid or array). The dies 304 may have a similar size or may have different sizes. Each die 304 may be similar to another die 304 or different in size, shape, data capacity, or control circuitries. The dies 304 may also be positioned on a single side or on multiple sides of the memory module 302.

One or more of the dies 304-1 to 304-D includes bank groups 306-1 to 306-G, with G representing a positive integer. Each bank group 306 includes at least two banks 118, such as banks 118-1 to 118-B. The bank group 306 also includes the bank-shared circuitry 120. The relationship between the banks 118-1 to 118-B and the bank-shared circuitry 120 are further described with respect to FIG. 4.

Figure 4:
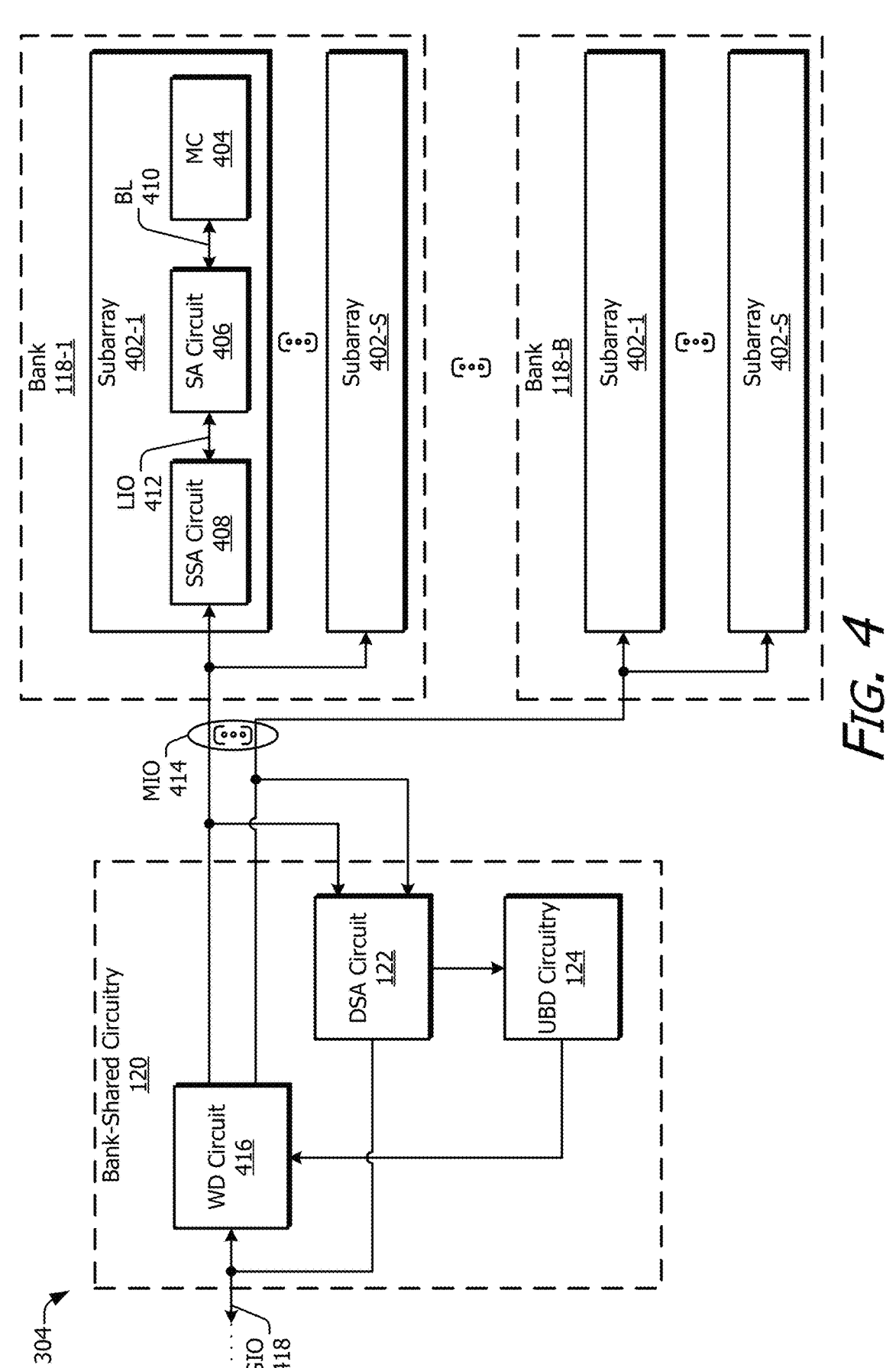
FIG. 4 illustrates example components of a die with bank-shared circuitry that supports usage-based disturbance mitigation.

FIG. 4 illustrates example components of the die 304. In the depicted configuration, the die 304 includes banks 118-1 to 118-B. Each bank 118 includes multiple subarrays 402-1 to 402-S, where S represents a positive integer. The banks 118-1 and 118-B can include a same quantity of subarrays 402, as shown in FIG. 4, or different quantities of subarrays 402.

Each subarray 402 includes memory cells 404 (MC 404), at least one sense amplifier circuit 406 (SA circuit 406), and optionally at least one subarray sense amplifier circuit 408 (SSA circuit 408). The memory cells 404 associated with each subarray 402 represent a group (or subset) of memory cells of the memory array 204. A portion of these memory cells 404 can store information associated with usage-based disturbance mitigation, as further described with respect to FIG. 5. Bit lines 410 (BL 410) couple the memory cells 404 to sense amplifiers within the sense amplifier circuit 406. The bit lines 410 can include differential line pairs.

The sense amplifier circuit 406, which can also be referred to as a sense amplifier array, provides an interface between the bit lines 410 and local input/output (LIO) lines 412 (LIO 412). The local input/output lines 412 can be implemented using differential line pairs. In general, the sense amplifier circuit 406 provides amplification for reading or writing data to the memory cells 404. The local input/output lines 412 couple the sense amplifier circuit 406 to the subarray sense amplifier circuit 408.

The subarray sense amplifier circuit 408, which can also be referred to as a subarray sense amplifier array, provides an interface between the local input/output lines 412 and main input/output (MIO) lines 414 (MIO 414). The main input/output lines 414 can be implemented using single-ended lines or differential line pairs. In general, the subarray amplifier circuit 408 provides amplification for a corresponding subarray 402 during read or write operations. Although not explicitly shown, the subarray 402 can include other components, including buffers, sub-word line drivers, column switches, and so forth.

The subarrays 402-1 to 402-S of each bank 118-1 to 118-B are coupled to the bank-shared circuitry 120 by the main input/output lines 414 (MIO 414). The bank-shared circuitry 120 includes the data sense amplifier circuit 122, the usage-based disturbance circuitry 124, and a write driver circuit 416 (WD circuit 416). The data sense amplifier circuit 122 includes multiple sense amplifiers. A first subset of these sense amplifiers is coupled to the usage-based disturbance circuitry 124 and support usage-based disturbance mitigation. A second subset of the sense amplifiers is coupled to global input/output (GIO) lines 418 (GIO 418). The global input/output lines 418 can be implemented using single-ended lines and generally couple the data sense amplifier circuit 122 to the interface 206. The data sense amplifier circuit 122 provides amplification for one of the banks 118-1 to 118-B during read operations and usage-based disturbance mitigation.

The usage-based disturbance circuitry 124 is coupled between the data sense amplifier circuit 122 and the write driver circuit 416. The write driver circuit 416 is coupled to the subarrays 402-1 to 402-S of the banks 118-1 to 118-B by the main input/output lines 414. Additionally, the write driver circuit 416 is coupled to the interface 206 by the global input/output lines 418.

During a read operation, the memory cells 404 are activated and data is read from the memory cells 404. The sense amplifier circuit 406 senses and amplifies the data on the bit lines 410 and passes this data to the local input/output lines 412. The subarray sense amplifier circuit 408 amplifies the data on the local input/output lines 412 and passes the data to the main input/output lines 414. The data sense amplifier circuit 122 amplifies the data on the main input/output lines 414 and passes the data to the global input/output lines 418. The interface 206 passes the data to the memory controller 114.

During a write operation, the write driver circuit 416 receives data from the memory controller 114 via the global input/output lines 418. The write driver circuit 416 passes the data to the main input/output lines 414. The subarray sense amplifier circuit 408 amplifies the data on the main input/output lines 414 and passes the data to the local input/output lines 412. The sense amplifier circuit 406 amplifies the data on the local input/output lines 412 and passes the data to the bit lines 410. The memory cells 404 store the data.

As part of the read and/or write operations, the usage-based disturbance circuitry 124 receives data associated with usage-based disturbance mitigation from a portion of the memory cells 404. The data associated with usage-based disturbance mitigation can include an activation count associated with row that is activated during the read operation and/or parity bits. The usage-based disturbance circuitry 124 can provide modified data to the write driver circuit 416 to update the data associated with usage-based disturbance mitigation that is stored within the memory cells 404. For example, the usage-based disturbance circuitry 124 can update the activation count associated with the row and pass this updated activation count to the write driver circuit 416. The write driver circuit 416 writes the updated activation count to the portion of the memory cells 404.

The usage-based disturbance circuitry 124 also analyzes this data to monitor for a condition associated with usage-based disturbance. For instance, the usage-based disturbance circuitry 124 can detect a condition associated with usage-based disturbance based on the activation count exceeding a threshold. If the condition associated with usage-based disturbance is detected, the usage-based disturbance circuitry 124 can generate a control signal that causes the control circuitry 208 to refresh one or more rows within a bank 118 that is associated with the memory operation.

As shown in FIG. 4, the bank-shared circuitry 120 is coupled to multiple banks 118-1 to 118-B. Data passes through the bank-shared circuitry 120 for memory operations involving one of the banks 118-1 to 118-B. By using the same circuitry to service multiple banks 118-1 to 118-B, the die 304 can have a smaller footprint and can be cheaper to manufacture compared to other dies with circuitry dedicated for each bank. A portion of the data sense amplifier circuit 122 can be dedicated for mitigating usage-based disturbance, as further described with respect to FIG. 5.

Figure 5:
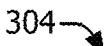
FIG. 5 illustrates portions of a die that support normal memory operations or usage-based disturbance mitigation.
Figure 5:
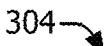

FIG. 5 illustrates portions 500 of a die 304 that support different operations. In the depicted configuration, the die 304 includes a first portion 500-1, which includes components that support normal memory operations (e.g., a read operation and/or a write operation). A second portion 500-2 of the die 304 includes components that support usage-based disturbance mitigation, which can be performed as part of a read, write, or precharge operation. The subarray 402 and the bank-shared circuitry 120 include components associated with the first portion 500-1 or the second portion 500-2, as further described below.

The subarray 402 includes the memory cells 404, the sense amplifier circuit 406, and the subarray sense amplifier circuit 408. A first subset of the memory cells 404 store data 502, which can be associated with a read or write operation. A second subset of the memory cells 404 store usage-based disturbance data 504 (UBD data 504). In an example implementation, the usage-based disturbance data 504 includes bits that represent a quantity of activations (e.g., an activation count or active count) since a last refresh for one or more rows of the memory cells 404. The usage-based disturbance data 504 can also include parity bits.

The sense amplifier circuit 406 includes multiple sense amplifiers (SA) 506. A first subset of sense amplifiers (SA 506-1) are coupled to the first subset of memory cells 404 using a first subset of the bit lines 410. A second subset of sense amplifiers (SA 506-2) are coupled to the second subset of memory cells 404 using a second subset of the bit lines 410. The subarray sense amplifier circuit 408 also includes multiple sense amplifiers 508. A first subset of sense amplifiers (SA 508-1) are coupled to the sense amplifiers 506-1 using a first subset of the local input/output lines 412. A second subset of sense amplifiers (SA 508-2) are coupled to the sense amplifiers 506-2 using a second subset of the local input/output lines 412.

The bank-shared circuitry 120 includes the data sense amplifier circuit 122 and the usage-based disturbance circuitry 124. The data sense amplifier circuit 122 includes multiple sense amplifiers 510. A first subset of sense amplifiers (SA 510-1) are coupled to the sense amplifiers 508-1 using a first subset of the main input/output lines 414. Although not explicitly shown in FIG. 5, the first subset of sense amplifiers 510-1 can also be coupled to a data bus using the global input/output lines 418. A second subset of sense amplifiers (SA 510-2) are coupled to the sense amplifiers 508-2 using a second subset of the main input/output lines 414. The usage-based disturbance circuitry 124 is coupled to the second subset of sense amplifiers 510-2.

As shown in FIG. 5, the memory cells 404 that can store the data 502 and the sense amplifiers 506-1, 508-1, and 510-1 represent the first portion 500-1 of the die 304 that supports normal memory operations. The memory cells 404 that can store the usage-based disturbance data 504, the sense amplifiers 506-2, 508-2, and 510-2, and the usage-based disturbance circuitry 124 represent the second portion 500-2 of the die 304 that supports usage-based disturbance mitigation. Although not shown, the write driver circuit 416 of the bank-shared circuitry 120 can support both normal memory operations (e.g., a write operation) and usage-based disturbance mitigation, as described above with respect to FIG. 4. Some commands cause the memory device 108 to utilize the data sense amplifier circuit 122 for normal memory operations and/or usage-based disturbance mitigation. Example commands are further described with respect to FIG. 6.

Figure 6:
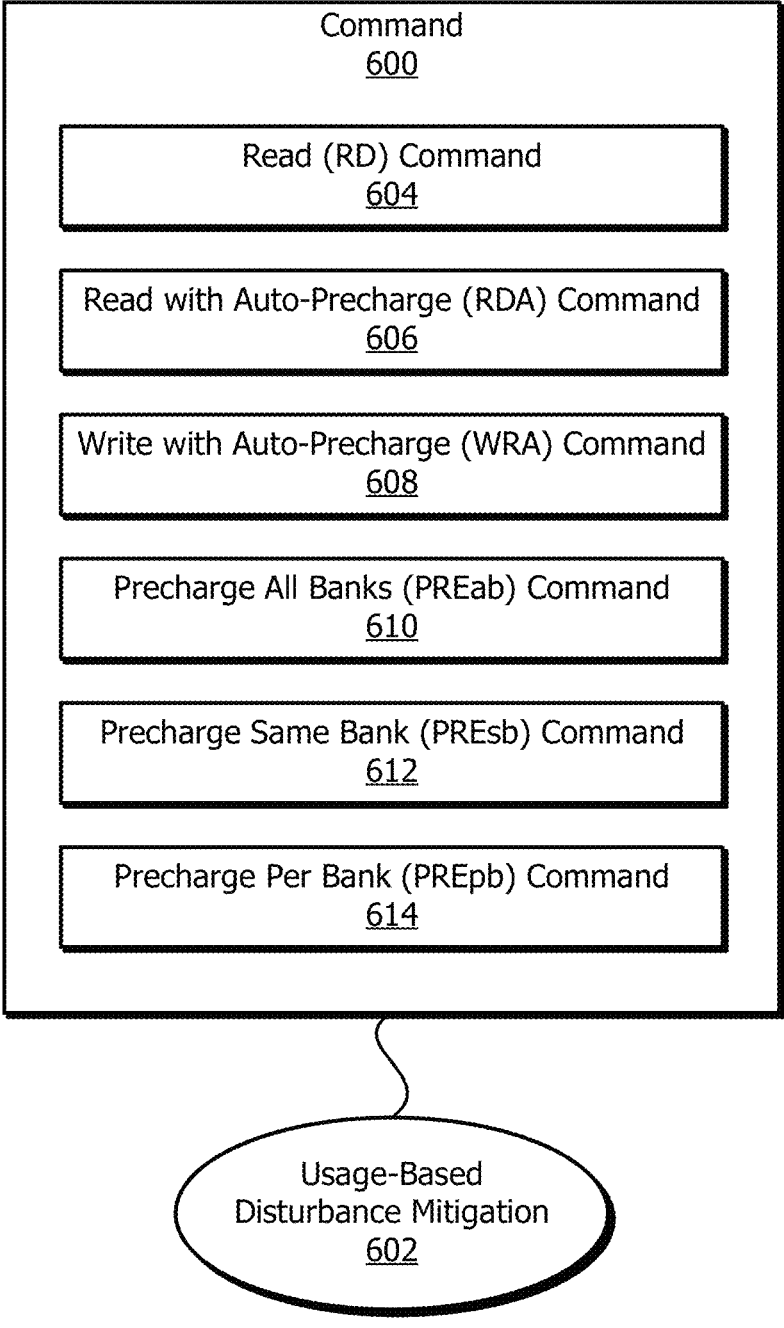
FIG. 6 illustrates example operations that can perform aspects of usage-based disturbance mitigation.

FIG. 6 illustrates example commands 600 that can cause the memory device 108 to perform aspects of usage-based disturbance mitigation 602. The usage-based disturbance mitigation 602 can include reading usage-based disturbance data 504 from the memory cells 404 of a bank 118 and/or writing usage-based disturbance data 504 to the memory cells 404 of the bank 118. In some aspects, the reading and/or writing of the usage-based disturbance data 504 represents an auto counter update operation performed by the usage-based disturbance circuitry 124. In some implementations, the memory device 108 can perform usage-based disturbance mitigation 602 in response to a precharge command, as described with respect to FIG. 7. In other implementations, the memory device 108 can perform usage-based disturbance mitigation 602 in response to another type of command, such as a read command.

Example commands 600 that cause the memory device 108 to perform aspects of usage-based disturbance mitigation 602 include a read (RD) command 604, a read with auto-precharge (RDA) command 606, a write with auto-precharge (WRA) command 608, a precharge all banks (PREab) command 610, a precharge same bank (PREsb) command 612, or a precharge per bank (PREpb) command 614. Other commands are also possible, including commands associated with a refresh. The commands 600 shown in FIG. 6 represent external commands that are transmitted by the memory controller 114 and received by the memory device 108.

When two of these commands 600 are transmitted sequentially (e.g., consecutively or in a back-to-back manner), the command timing circuit 126 applies an appropriate timing offset 128 to avoid a conflict with the memory device 108 performing aspects of usage-based disturbance mitigation 602. The sequential commands 600 can be associated with a same bank 118 or different banks 118. Explained another way, the memory controller 114 delays transmission of a second command by at least the timing offset 128 to allow sufficient time for the memory device 108 to finish utilizing the data sense amplifier circuit 122 for usage-based disturbance mitigation based on the first command 600 prior to the memory device 108 utilizing the data sense amplifier circuit 122 based on the second command 600. An example timing offset 128 applied between two sequential commands 600 is further described with respect to FIG. 7.

Figure 7:
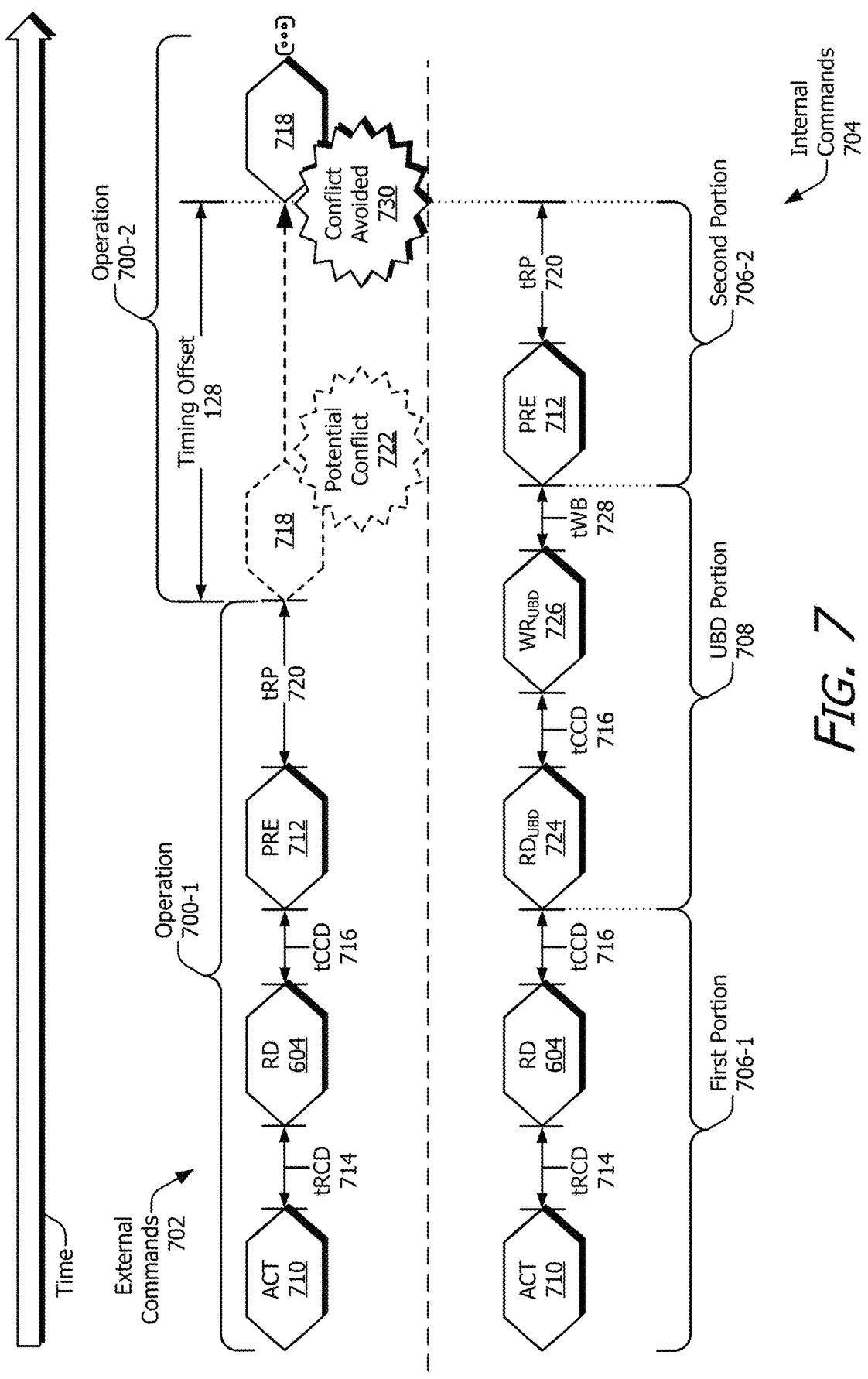
FIG. 7 illustrates an example sequence of operations in which aspects of conflict avoidance for bank-shared circuitry that supports usage-based disturbance mitigation may be implemented.

FIG. 7 illustrates an example sequence of memory operations 700 in which aspects of conflict avoidance for bank-shared circuitry 120 that supports usage-based disturbance mitigation 602 is implemented. Time is shown as elapsing from left to right. In this example, the memory controller 114 causes the memory device 108 to perform two operations 700-1 to 700-2. The first operation 700-1 represents a read operation in this example. The second operation 700-2 can represent another memory operation, such as a read or write operation. The second operation 700-2 is performed after the first operation 700-1. The operations 700-1 and 700-2 can be associated with a same bank 118 or different banks 118.

The operations 700-1 and 700-2 are considered sequential operations (e.g., consecutive operations 700 or back-to-back operations 700). In general, the second operation 700-2 is an operation that occurs after the first operation 700-1 and before another subsequent operation (e.g., a third operation). Although not explicitly shown, the memory device 108 can be in a stand-by or idle state between the completion of the operation 700-1 and the start of the operation 700-2. In other words, additional time can elapse between the end of the operation 700-1 and the start of the operation 700-2.

A sequence of external commands 702 that are transmitted by the memory controller 114 and received by the memory device 108 are shown towards the top of FIG. 7. The time depicted with respect to the external commands 702 can represent a time at which the external commands 702 are present at a command bus associated with the interconnect 106.

A sequence of internal commands 704 that are executed by the memory device 108 are shown towards the bottom of FIG. 7. These internal commands 704 are associated with the first operation 700-1. Additional internal commands 704 associated with the second operation 700-2 are not explicitly shown in FIG. 7. The internal commands 704 associated with the first operation 700-1 are grouped into a first portion 706-1, a usage-based disturbance portion 708 (UBD portion 708), and a second portion 706-2. During the first portion 706-1 and the second portion 706-2, the memory device 108 executes internal commands 704 that directly correspond with the external commands 702 or more generally the operation 700-1. During the usage-based disturbance portion 708, the memory device 108 performs usage-based disturbance mitigation 602 based on one or more other internal commands 704 that differ than the external commands 702 of the operation 700-1. Operations associated with the usage-based disturbance mitigation 602 can involve reading and/or writing usage-based disturbance data 504. The time between commands are not necessarily drawn to scale in FIG. 7.

As part of the first operation 700-1, the memory device 108 receives an activation (ACT) command 710 (ACT 710), a read (RD) command 604 (RD 604), and a precharge command 712 (PRE 712), which can be one of the precharge commands 610, 612, or 614. A timing offset between the activation command 710 and the read command 604 is represented by tRCD 714. The timing offset tRCD 714 is sufficient to enable the memory device 108 to activate a row of memory cells 404 associated with the activation command 710 and sense data within the row using the sense amplifier circuit 406. A timing offset between the read command 604 and the precharge command 712 is represented by tCCD 716.

If the memory device 108 does not perform aspects of usage-based disturbance mitigation 602, a first command 718 associated with the second operation 700-2 can occur after a timing offset tRP 720 has elapsed since the precharge command 712. However, if the memory device 108 performs usage-based disturbance mitigation 602, there could a potential conflict 722 as the timing offset tRP 720 doesn't provide enough time to utilize the bank-shared circuitry 120 for usage-based disturbance mitigation 602.

In this example, the memory device 108 performs usage-based disturbance mitigation 602, which includes executing, based on the precharge 712 command, additional internal commands 704 represented by the usage-based disturbance portion 708. In particular, the precharge 712 command causes the memory device 108 to generate and perform operations based on a usage-based disturbance read command 724 ($RD_{UBD}$) 724) and a usage-based disturbance write command 726 ($WR_{UBD}$) 726). Based on the usage-based disturbance read command 724, the memory device 108 reads the usage-based disturbance data 504 from a subarray 402 of one of the banks 118-1 to 118-B and passes this data to the usage-based disturbance circuitry 124 using the second subset of sense amplifiers 510-2 of the data sense amplifier circuit 122. For the usage-based disturbance write command 726, the memory device 108 writes modified usage-based disturbance data 504 provided by the usage-based disturbance circuitry 124 to the subarray 402 of one of the banks 118-1 to 118-B.

A timing offset between the usage-based disturbance read command 724 and the usage-based disturbance write command 726 is represented by tCCD 716. The timing offset tCCD 716 allows sufficient time for the memory device 108 to read and pass the usage-based disturbance data 504 based on the usage-based disturbance read command 724. A timing offset between the usage-based disturbance write command 726 and the precharge command 712 is represented by tWB 728. The timing offset tWB 728 allows sufficient time for the memory device 108 to write the usage-based disturbance data 504 to the bank 118.

After the usage-based disturbance portion 708 is performed, the memory device 108 executes the precharge operation 712, as shown in the second portion 706-2. To avoid a conflict associated with the memory device 108 performing aspects of usage-based disturbance mitigation 602 between the precharge command 712 and a subsequent command 718, the memory controller 114 applies at least the timing offset 128 between these commands. In some implementations, the timing offset 128 can be an additional delay that is applied along with the timing offset tRP 720. In other implementations, the timing offset 128 can represent a total delay between these commands. In other words, the timing offset 128 can incorporate the timing offset tRP 720. Due to the timing offset 128, the conflict associated with using the bank-shared circuitry 120, and more specifically the second subset of sense amplifiers 510-2, in accordance with commands 712 and 718 can be avoided, as indicated at 730.

In this example, the timing offset 128 is applied between the precharge command 712 and a next command 718 associated with the operation 700-2. In general, the timing offset 128 can be applied between any two of the commands 600 shown in FIG. 6. For example, if the memory device 108 performs usage-based disturbance mitigation 602 based on the read command 604 instead of the precharge command 712, the memory controller 114 can apply the timing offset 128 between the read command 604 and the precharge command 712 to allow sufficient time for the memory device 108 to execute the internal commands 704 associated with the usage-based disturbance portion 708 prior to executing the precharge commands 712.

Example Methods

This section describes example methods for implementing aspects of conflict avoidance for bank-shared circuitry supporting usage-based disturbance mitigation with reference to the flow diagrams of FIGS. 8 and 9. These descriptions may also refer to components, entities, and other aspects depicted in FIGS. 1 to 7 by way of example only. The described methods are not necessarily limited to performance by one entity or multiple entities operating on one device.

FIG. 8 illustrates a flow diagram 800, which includes operations 802 through 804. In aspects, operations of the method 800 are implemented by a memory controller 114 as described with reference to FIG. 1. At 802, a first command that causes a memory device to utilize a subset of sense amplifiers of a data sense amplifier circuit of the memory device is transmitted to the memory device. The subset of sense amplifiers is coupled to at least two banks of the memory device and circuitry of the memory device that mitigates usage-based disturbance within the at least two banks.

For example, the memory controller 114 transmits a first command 600 that causes a memory device 108 to utilize the second subset of sense amplifiers 510-2 of the data sense amplifier circuit 122. The second subset of sense amplifiers 510-2 are coupled to at least two banks 118-1 to 118-B of the memory device 108 and usage-based disturbance circuitry 124 that mitigates usage-based disturbance within the at least two banks 118-1 to 118-B. The first command 600 can include any of the commands 600 shown in FIG. 6. In an example situation, the first command 600 represents the precharge command 712 in FIG. 7.

At 804, a second command that causes the memory device to utilize the subset of sense amplifiers is transmitted to the memory device. The transmission of the second command has a timing offset relative to the first command such that the memory device finishes utilizing the subset of sense amplifiers based on the first command prior to utilizing the subset of sense amplifiers based on the second command. For example, the memory controller 114 transmits the second command 600 to the memory device 108. The second command 600 causes the memory device 108 to utilize the second subset of sense amplifiers 510-2. The transmission of the second command 600 has at least a timing offset 128 relative to the first command such that the memory device 108 finishes utilizing the second subset of sense amplifiers 510-2 based on the first command 600 prior to utilizing the subset of sense amplifiers 510-2 based on the second command 600. The second command 600 can include any of the commands 600 shown in FIG. 6. In an example situation, the second command 600 represents a first command 718 of a subsequent memory operation 700-2, as shown in FIG. 7. In general, the first and second commands 600 can be associated with a same operation 700, different operations 700, a same bank 118, or different banks 118.

FIG. 9 illustrates a flow diagram 900, which includes operation 902. In aspects, operations of the method 900 are implemented by or with a memory device 108 as described with reference to FIGS. 1 to 7. At 902, two sequential commands that are separated in time by at least a timing offset are received from a memory controller. The timing offset enables a memory device to finish utilizing a subset of sense amplifiers for usage-based disturbance mitigation based on a first command of the two sequential commands prior to utilizing the subset of sense amplifiers based on a second command of the two sequential commands.

For example, the memory device 108 receives two sequential commands 600 that are separated in time by at least the timing offset 128. The two sequential commands 600 can be any of the commands 600 shown in FIG. 6. The timing offset 128 enables the memory device 108 to finish utilizing the second subset of sense amplifiers 510-2 of the data sense amplifier circuit 122 for usage-base disturbance mitigation 602 based on a first command 600 of the two sequential commands prior to utilizing the second subset of sense amplifiers 510-2 based on a second command 600 of the two sequential commands. The first and second commands 600 can be associated with a same operation 700, different operations 700, a same bank 118, or different banks 118.

For the figures described above, the orders in which operations are shown and/or described are not intended to be construed as a limitation. Any number or combination of the described process operations can be combined or rearranged in any order to implement a given method or an alternative method. Operations may also be omitted from or added to the described methods. Further, described operations can be implemented in fully or partially overlapping manners.

Aspects of these methods may be implemented in, for example, hardware (e.g., fixed-logic circuitry or a processor in conjunction with a memory), firmware, software, or some combination thereof. The methods may be realized using one or more of the apparatuses or components shown in FIGS. 1 to 7, the components of which may be further divided, combined, rearranged, and so on. The devices and components of these figures generally represent hardware, such as electronic devices, packaged modules, IC chips, or circuits; firmware or the actions thereof; software; or a combination thereof. Thus, these figures illustrate some of the many possible systems or apparatuses capable of implementing the described methods.

Computer-readable media includes both non-transitory computer storage media and communication media including any medium that facilitates transfer of a computer program (e.g., an application) or data from one entity to another. Non-transitory computer storage media can be any available medium accessible by a computer, such as RAM, ROM, Flash, EEPROM, optical media, and magnetic media.

In the following, various examples for implementing aspects of conflict avoidance for bank-shared circuitry supporting usage-based disturbance mitigation are described:

Example 1: An apparatus comprising:
    a memory device comprising:
        at least two banks;
        circuitry configured to mitigate usage-based disturbance within the at least two banks; and
        a data sense amplifier circuit comprising a subset of sense amplifiers coupled to the circuitry and the at least two banks,
    the memory device configured to:
        receive, from a memory controller, two sequential commands that are separated in time by a timing offset, the timing offset enabling the memory device to finish utilizing the subset of sense amplifiers based on a first command of the two sequential commands prior to utilizing the subset of sense amplifiers based on a second command of the two sequential commands.

Example 2: The apparatus of example 1 or any other example, wherein:
    the memory device is configured to generate an internal command associated with usage-based disturbance mitigation based on the first command; and
    the internal command is different than the first command.

Example 3: The apparatus of example 2 or any other example, wherein the first command is associated with a precharge operation.

Example 4: The apparatus of example 2 or any other example, wherein:
    the first command is associated with a bank of the at least two banks; and the subset of sense amplifiers of the data sense amplifier circuit are configured to pass data from the bank to the circuitry based on the internal command.

Example 5: The apparatus of example 4 or any other example, wherein:
    the data is associated with usage-based disturbance;
    each bank of the at least two banks comprises a memory array, the memory array comprising multiple memory cells;
    a subset of the memory cells is configured to store the data;
    the subset of sense amplifiers is coupled to the subset of the memory cells associated with each of the at least two banks;
    the memory device is configured to perform at least one of the following based on the internal command:
        read the data from the subset of the memory cells associated with the bank; or
        write modified data generated by the circuitry to the subset of the memory cells associated with the bank.

Example 6: The apparatus of example 1 or any other example, wherein the first and second commands are associated with a same bank of the at least two banks.

Example 7: The apparatus of example 1 or any other example, wherein the first and second commands are associated with different banks of the at least two banks.

Example 8: The apparatus of example 1 or any other example, wherein the first command and the second command each comprise one of the following:
    a read command;
    a read with auto precharge command;
    a write with auto precharge command;
    a precharge command;
    a precharge single bank command; or
    a precharge all bank command.

Example 9: The apparatus of example 1 or any other example, the memory device is configured to mitigate the usage-based disturbance on a per-row basis using the subset of sense amplifiers and the circuitry.

Example 10: A method comprising:
    transmitting, to a memory device, a first command that causes the memory device to utilize a subset of sense amplifiers of a data sense amplifier circuit of the memory device, the subset of sense amplifiers coupled to at least two banks of the memory device and circuitry of the memory device that mitigates usage-based disturbance within the at least two banks; and
    transmitting, to the memory device, a second command that causes the memory device to utilize the subset of sense amplifiers, the transmission of the second command having a timing offset relative to the first command such that the memory device finishes utilizing the subset of sense amplifiers based on the first command prior to utilizing the subset of sense amplifiers based on the second command.

Example 11: The method of example 10 or any other example, wherein:
    the transmitting of the first command and the transmitting of the second command comprises transmitting two sequential commands; and
    the transmitting of the second command based on the timing offset avoids a conflict associated with the memory device utilizing the subset of sense ampli-
fiers to pass data to the circuitry based on the first
command.

Example 12: The method of example 10 or any other
example, wherein:
the transmitting of the first command causes the
memory device to generate an internal command
associated with usage-based disturbance; and
the internal command is different than the first com-
mand.

Example 13: The method of example 12 or any other
example, wherein the transmitting of the first command
comprises transmitting a command associated with a
precharge operation.

Example 14: The method of example 10 or any other
example, wherein the transmitting of the first or second
command comprises transmitting one of the following
commands:
a read command;
a read with auto precharge command;
a write with auto precharge command;
a precharge per bank command;
a precharge same bank command; or
a precharge all command.

Example 15: An apparatus comprising:
a memory controller configured to:
transmit, to a memory device, a first command
associated with the memory device utilizing a
subset of sense amplifiers of a data sense amplifier
circuit of the memory device, the subset of sense
amplifiers coupled to at least two banks of the
memory device and circuitry that mitigates usage-
based disturbance within the at least two banks;
and
transmit, to the memory device, a second command
associated with the memory device utilizing the
subset of sense amplifiers, the transmission of the
second command having a timing offset relative to
the first command such that the memory device
finishes utilizing the subset of sense amplifiers for
the first command prior to utilizing the subset of
sense amplifiers for the second command.

Example 16: The apparatus of example 15 or any other
example, wherein:
the first and second commands comprise sequential
commands; and
the timing offset enables the memory device to avoid a
conflict associated with utilizing the subset of sense
amplifiers for the first and second commands.

Example 17: The apparatus of example 15 or any other
example, wherein:
the first command is associated with a bank of the at
least two banks; and
the transmitting of the first command causes the
memory device to:
read data associated with usage-based disturbance
from the bank; and
pass the data to the circuitry using the subset of sense
amplifiers.

Example 18: The apparatus of example 15 or any other
example, wherein the first and second commands are
associated with a same bank of the at least two banks.

Example 19: The apparatus of example 15 or any other
example, wherein the first and second commands are
associated with different banks of the at least two
banks.

Example 20: The apparatus of example 15 or any other
example, wherein at least one command of the first and
second commands comprises a command associated
with a precharge operation.

Unless context dictates otherwise, use herein of the word
"or" may be considered use of an "inclusive or," or a term
that permits inclusion or application of one or more items
that are linked by the word "or" (e.g., a phrase "A or B" may
be interpreted as permitting just "A," as permitting just "B,"
or as permitting both "A" and "B"). Also, as used herein, a
phrase referring to "at least one of" a list of items refers to
any combination of those items, including single members.
For instance, "at least one of a, b, or c" can cover a, b, c, a-b,
a-c, b-c, and a-b-c, as well as any combination with mul-
tiples of the same element (e.g., a-a, a-a-a, a-a-b, a-a-c,
a-b-b, a-c-c, b-b, b-b-b, b-b-c, c-c, and c-c-c, or any other
ordering of a, b, and c). Further, items represented in the
accompanying figures and terms discussed herein may be
indicative of one or more items or terms, and thus reference
may be made interchangeably to single or plural forms of the
items and terms in this written description.

Conclusion

Although aspects of implementing aspects of conflict
avoidance for bank-shared circuitry that supports usage-
based disturbance mitigation have been described in lan-
guage specific to certain features and/or methods, the subject
of the appended claims is not necessarily limited to the
specific features or methods described. Rather, the specific
features and methods are disclosed as a variety of example
implementations of implementing aspects of conflict avoid-
ance for bank-shared circuitry that supports usage-based
disturbance mitigation.

What is claimed is:
1. An apparatus comprising:
a memory device comprising:
at least two banks, each bank of the at least two banks
comprising:
multiple rows configured to store data associated
with mitigating usage-based disturbance; and
a sense amplifier circuit coupled to memory cells of
the multiple rows via bit lines; and
bank-shared circuitry coupled to the at least two banks,
the bank-shared circuitry comprising:
circuitry configured to mitigate the usage-based dis-
turbance within the at least two banks based on the
data; and
a data sense amplifier circuit coupled to sense ampli-
fier circuits of the at least two banks via main
input/output lines, the data sense amplifier circuit
comprising a first subset of sense amplifiers
coupled between a first subset of the main input/
output lines and the circuitry, the first subset of
sense amplifiers configured to amplify the data
that is read from a bank of the at least two banks
and provide the data to the circuitry,
the memory device configured to:
receive, from a memory controller, two sequential
commands that are separated in time by a timing
offset, the timing offset enabling the memory
device to finish utilizing the first subset of sense
amplifiers based on a first command of the two
sequential commands prior to utilizing the first
subset of sense amplifiers based on a second
command of the two sequential commands, the
first command associated with a particular row of the multiple rows, the timing offset enabling the circuitry to perform a first operation that updates the data that is stored within the particular row using the circuitry and the first subset of sense amplifiers prior to execution of a second operation associated with the second command.

2. The apparatus of claim 1, wherein the data sense amplifier circuit comprises a second subset of sense amplifiers coupled between a second subset of the main input/output lines and at least one global input/output line that is configured to be coupled to a memory controller.

3. The apparatus of claim 1, wherein the first command is associated with a precharge operation.

4. The apparatus of claim 3,
wherein the time delay is greater than a row precharge timing offset (tRP).

5. The apparatus of claim 1, wherein:
each row of the multiple rows within the at least two banks comprises a subset of memory cells configured to store the data;
the first subset of sense amplifiers is coupled to the subset of the memory cells associated with each of the at least two banks; and
the memory device is configured to:
read, responsive to reception of the first command and using the first subset of sense amplifiers, the data from the subset of the memory cells associated with the particular row of the bank;
pass, using the first subset of sense amplifiers, the data to the circuitry; and
write updated data generated by the circuitry to the subset of the memory cells associated with the particular row of the bank.

6. The apparatus of claim 1, wherein the first and second commands are associated with a same bank of the at least two banks.

7. The apparatus of claim 1, wherein the first and second commands are associated with different banks of the at least two banks.

8. The apparatus of claim 1, wherein the first command and the second command each comprise one of the following:
a read command;
a read with auto precharge command;
a write with auto precharge command;
a precharge command;
a precharge single bank command; or
a precharge all bank command.

9. The apparatus of claim 1, wherein the first command comprises a read command.

10. A method performed by a memory controller, the method comprising:
transmitting, to a memory device, a first command that causes the memory device to utilize a first subset of sense amplifiers of a data sense amplifier circuit of the memory device, the data sense amplifier circuit coupled to sense amplifier circuits of at least two banks of the memory device via main input/output lines of the memory device, the first subset of sense amplifiers coupled between a first subset of the main input/output lines and circuitry of the memory device that mitigates usage-based disturbance within the at least two banks, the first command associated with a particular row within one of the at least two banks; and
transmitting, to the memory device, a second command that causes the memory device to utilize the first subset of sense amplifiers, the transmission of the second command having a timing offset relative to the first command such that the memory device finishes utilizing the first subset of sense amplifiers based on the first command prior to utilizing the first subset of sense amplifiers based on the second command, the timing offset enabling the circuitry of the memory device to perform a first operation that updates data stored within a portion of the particular row using the circuitry and the first subset of sense amplifiers prior to execution of a second operation associated with the second command, the data associated with mitigating the usage-based disturbance.

11. The method of claim 10, wherein:
the transmitting of the first command and the transmitting of the second command comprises transmitting two sequential commands; and
the transmitting of the second command based on the timing offset avoids a conflict associated with the memory device utilizing the first subset of sense amplifiers to pass the data to the circuitry based on the first command.

12. The method of claim 10, wherein:
the transmitting of the first command causes the memory device to generate an internal command associated with usage-based disturbance; and
the internal command is different than the first command.

13. The method of claim 12, wherein the transmitting of the first command comprises transmitting a command associated with a precharge operation.

14. The method of claim 10, wherein the transmitting of the first or second command comprises transmitting one of the following commands:
a read command;
a read with auto precharge command;
a write with auto precharge command;
a precharge per bank command;
a precharge same bank command; or
a precharge all command.

15. An apparatus comprising:
a memory controller configured to:
transmit, to a memory device, a first command associated with the memory device utilizing a first subset of sense amplifiers of a data sense amplifier circuit of the memory device, the data sense amplifier circuit coupled to sense amplifier circuits of at least two banks of the memory device via main input/output lines of the memory device, the first subset of sense amplifiers coupled between a first subset of the main input/output lines and circuitry that mitigates usage-based disturbance within the at least two banks, the first command associated with a particular row within one of the at least two banks; and
transmit, to the memory device, a second command associated with the memory device utilizing the first subset of sense amplifiers, the transmission of the second command having a timing offset relative to the first command such that the memory device finishes utilizing the first subset of sense amplifiers for the first command prior to utilizing the subset of sense amplifiers for the second command, the timing offset enabling the circuitry of the memory device to perform a first operation that updates data stored within a portion of the particular row using the circuitry and the first subset of sense amplifiers prior to execution of a second operation associated with the second command, the data associated with mitigating the usage-based disturbance.

16. The apparatus of claim 15, wherein:

the first and second commands comprise sequential commands; and the timing offset enables the memory device to avoid a conflict associated with utilizing the first subset of sense amplifiers for the first and second commands.

17. The apparatus of claim 15, wherein:

the first command is associated with a bank of the at least two banks; and the transmission of the first command causes the memory device to:

read the data associated with usage-based disturbance from the bank; and pass the data to the circuitry using the subset of sense amplifiers.

18. The apparatus of claim 15, wherein the first and second commands are associated with a same bank of the at least two banks.

19. The apparatus of claim 15, wherein the first and second commands are associated with different banks of the at least two banks.

20. The apparatus of claim 15, wherein at least one command of the first and second commands comprises a command associated with a precharge operation.

* * * * *